(12) United States Patent
Henderson

(10) Patent No.: US 11,573,614 B2
(45) Date of Patent: Feb. 7, 2023

(54) SYSTEM AND METHOD FOR ACCOMMODATING MULTIPLE TYPES OF DEVICES IN A HALF-HEIGHT BAY

(71) Applicant: Dell Products L.P., Round Rock, TX (US)

(72) Inventor: Gregory Lane Henderson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 332 days.

(21) Appl. No.: 16/788,433

(22) Filed: Feb. 12, 2020

(65) Prior Publication Data

US 2021/0247821 A1    Aug. 12, 2021

(51) Int. Cl.
*H01S 4/00*        (2006.01)
*G06F 1/18*        (2006.01)
*G11B 33/02*      (2006.01)

(52) U.S. Cl.
CPC ............ *G06F 1/187* (2013.01); *G11B 33/027* (2013.01)

(58) Field of Classification Search
CPC ...... G11B 33/027; G11B 33/124; G06F 1/187
See application file for complete search history.

(56) References Cited

U.S. PATENT DOCUMENTS

| | | | |
|---|---|---|---|
| 9,025,278 B1* | 5/2015 | Chen ....................... | G06F 1/187 360/99.15 |
| 10,782,748 B1* | 9/2020 | Tsorng .................... | G06F 1/187 |
| 2012/0236511 A1* | 9/2012 | Shu ....................... | G11B 33/124 361/748 |

* cited by examiner

*Primary Examiner* — Paul D Kim
(74) *Attorney, Agent, or Firm* — McDermott Will & Emery LLP

(57) ABSTRACT

A system, information handling system and method are disclosed for accommodating multiple devices in a single bay. A bracket comprises a pair of sidewalls adapted for slidable insertion in slots in a bay. An upper portion of the bracket comprises inner walls formed with slots and a lower portion formed with flanges. A tray formed with rails on exterior surfaces may be inserted in the slots in the inner walls of the bracket. A first SFF device or devices may be positioned in the tray and a second SFF device may be positioned in the flanges to install multiple SFF devices in the bay.

17 Claims, 11 Drawing Sheets

SYSTEM AND METHOD FOR ACCOMMODATING MULTIPLE TYPES OF DEVICES IN A HALF-HEIGHT BAY

BACKGROUND

Field of the Disclosure

This disclosure relates generally to information handling systems and, more particularly, to desktop cases with bays for peripheral devices associated with information handling systems and methods for accommodating multiple types of devices in a half-height bay in an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

As the demand for manufacturers to offer variations on information handling systems continues to increase, manufacturers are building systems for various applications, with each variation having tradeoffs. For example, case designs for information handling systems with device bays mounted on a rotating wall space can minimize the overall size of the system. Moving the bays outside the boundaries of a motherboard and fixing them to the case helps reduce cost, improves serviceability and enables more flexibility of thermal solutions. However, this can result in an increase in overall size if separate bays must be created to accommodate each type of removable device.

Embodiments disclosed herein are generally directed to a system for installing multiple devices in a single bay in a case in an information handling system. The system includes a tray with a pair of rails and a bracket with a pair of slots for receiving the pair of rails. The tray is configured for receiving a first form factor device. The bracket comprises a base, two inner walls with slots for coupling to the rails, two sidewalls coupled to the two inner walls by lateral extensions, a pair of flanges for receiving a second device having a second form factor, and a rear wall having an opening. Each sidewall is adapted to engage hardware, such as a screws or other threaded hardware. Slots in the bay guide the hardware, allowing a user to slide the bracket in and out of the bay. In some embodiments, the tray includes a deflectable tab, wherein insertion of the tray in the bracket advances the tab through an opening in the rear wall of the bracket to deflect the tab from a first configuration to a second configuration, wherein the tab returns to substantially the first configuration to secure the tray to the bracket. In some embodiments, an upper portion of the bracket is configured for receiving one 3.5 inch Hard Disk Drive (HDD) or two 2.5 inch HDDs and the lower portion is configured for receiving an SFF-8552 compliant device.

In any of the disclosed embodiments, a single bracket can support toolless installing of any of a variety of Small Form Factor (SFF) devices in a half-height bay. Embodiments enable toolless installing of SFF devices while also enabling users to easily install other devices with different form factors.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
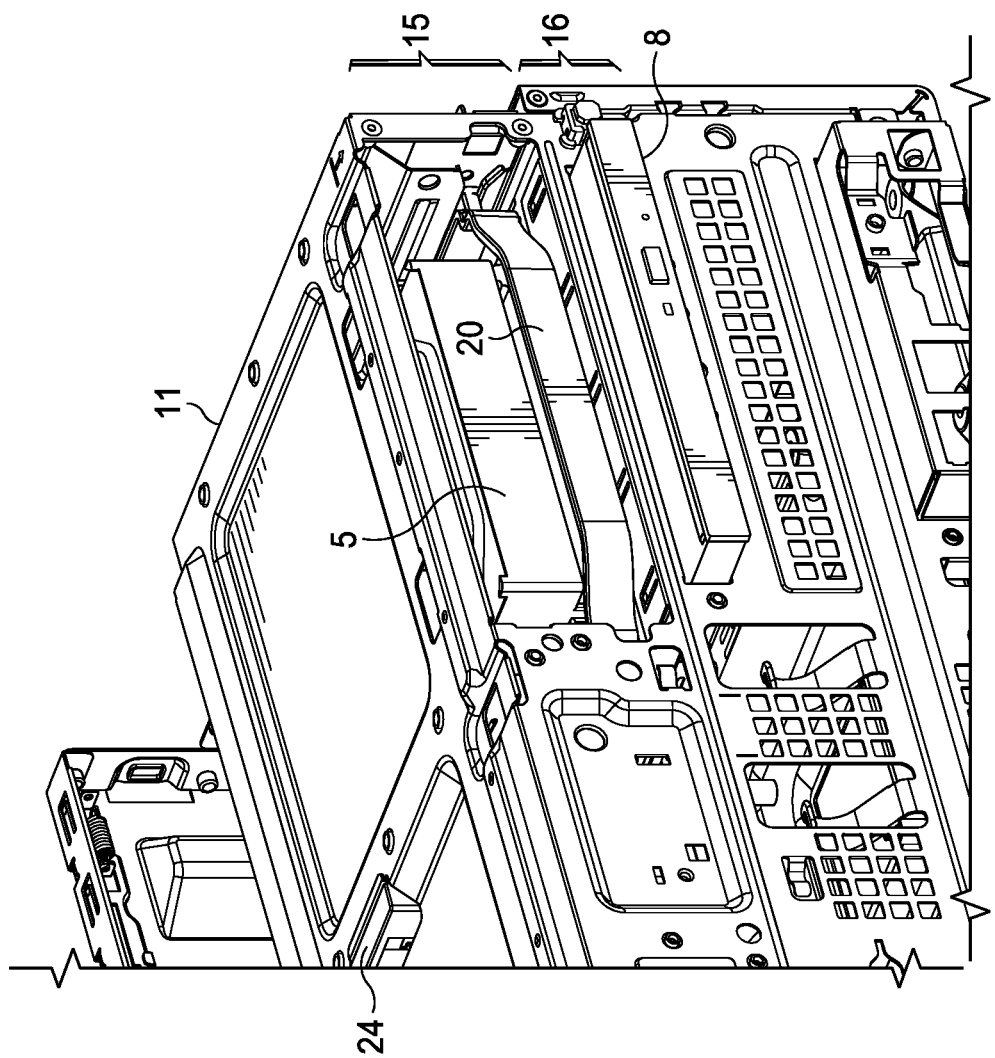
FIG. 1 depicts a perspective view of an exemplary desktop information handling system, illustrating multiple devices installed in multiple bays in a case.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, slot "12A"

and "12B" both refer to instances of a slot, may be referred to collectively as slots "12", and either one of which may be referred to generically as slot "12".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) systems, such as a keyboard, a mouse, and a video display. The information handling system may also include one or more buses operable to transmit communication between the various hardware components.

A desktop information handling system contains processors, boards, hubs, buses, cards, memory and other devices and systems for performing the functionality of an information handling system. Processors include any processor capable of executing program instructions. A motherboard is configured to provide structural support, power, and electrical connectivity between the various components. Such a motherboard includes multiple connector sockets in various configurations, adapted to receive pluggable circuit cards, component chip packages, etc. Processors are coupled to a platform controller hub (PCH) or a chipset via a front-side bus configured to coordinate I/O traffic between processors and other components. A PCH is coupled to graphics devices (e.g., one or more video cards or adaptors, etc.) via a graphics bus (e.g., an Accelerated Graphics Port or AGP bus, a Peripheral Component Interconnect (PCI) bus, etc.). A PCH is also coupled to one or more PCI devices (e.g., modems, network cards, sound cards, video cards, shared memory etc.) via the PCI bus. The PCH is further coupled to ports, pins, and/or adapters over a bus. Generally, the PCH is configured to handle various I/O operations, and the PCH provides interfaces such as, for instance, Universal Serial Bus (USB), audio, serial, parallel, Ethernet, and other interfaces, via ports, pins, and/or adapters over a bus. A PCH allows data to be exchanged between an information handling system and other devices, including other information handling systems attached to a network. In various information handling systems, a PCH supports communication via wired or wireless general data networks, including any suitable type of Ethernet network, via telecommunications/telephony networks, such as analog voice networks or digital fiber communications networks, via storage area networks such as Fiber Channel SANs, or via any other suitable type of network and/or protocol. An information handling system includes input devices, such as keyboards, keypads, touch screens, scanning devices, voice or optical recognition devices, or any other devices suitable for entering or retrieving data. Multiple I/O devices are in an information handling system. In some information handling systems, I/O devices are separate from the information handling system and the information handling system interacts with the I/O devices through a wired or wireless connection. In some information handling systems, a PCH is coupled to a non-volatile storage or memory device that stores a basic input output system/unified extensible firmware interface (BIOS/UEFI) via Low Pin Count (LPC) bus and is also coupled to a super I/O Controller and a baseboard management controller (BMC) via the LPC bus.

A computer-accessible media may include any tangible, non-transitory storage media or memory media such as electronic, magnetic, or optical media (e.g., magnetic disk, a hard drive, a CD/DVD-ROM, a Flash memory, etc.) coupled to the information handling system via a PCH. Where utilized herein, the terms "tangible" and "non-transitory" are intended to describe a computer-readable storage medium (or "memory") excluding propagating electromagnetic signals but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which are conveyed via a communication medium such as a network and/or a wireless link. Other types of peripheral devices include Common Access Card (CAC) readers.

Figure 2:
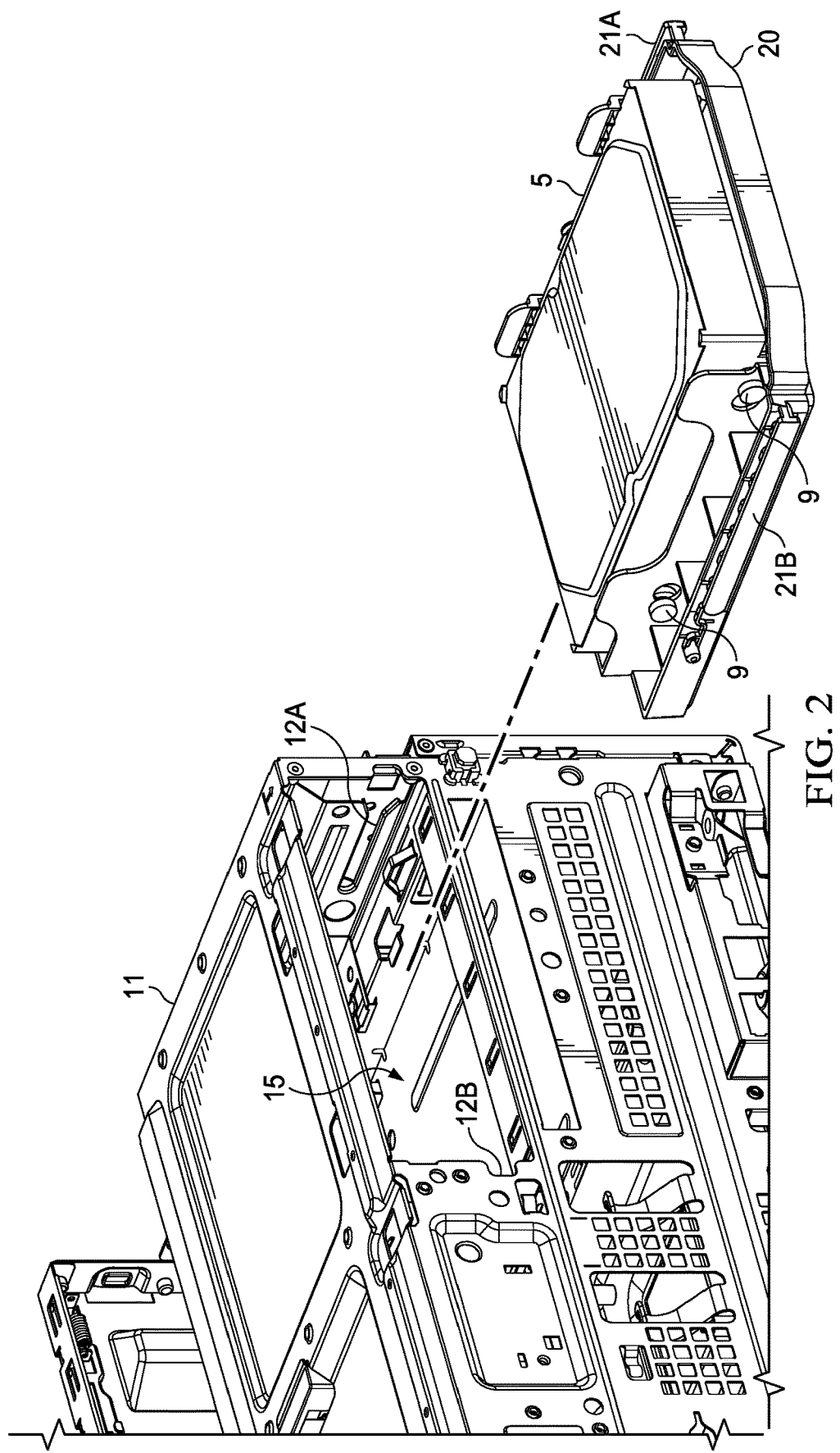
FIG. 2 depicts a partial perspective view of the exemplary desktop information handling system of FIG. 1, illustrating a single device installed in a half-height bay.

Referring to FIGS. 1 and 2, in many information handling systems, case 11 contains many of the devices and systems mentioned above. Peripheral devices may be installed in bays 15, 16 to provide different types of computer-accessible media separate from system memory. FIGS. 1 and 2 depict case 11 of an exemplary desktop information handling system in which case 11 is configured with bays 15, 16 for installing devices 5 and 8. The size of case 11 may limit expansion options and many desktop computers have integrated motherboards with on-board peripherals and have only one or two bays 15, 16 for expansion.

Each of bays 15, 16 may have an associated form factor that defines the size, shape and other physical specifications of components that may be inserted in bay 15 or 16. Bays 15 and 16 may have form factors designed to minimize the volume and footprint of case 11. As shown in FIGS. 1 and 2, bay 15 may be a half-height bay sized for installing a small form factor device 5 and bay 16 may be sized for installing a separate small form factor device 8 such as an Optical Disc Drive (ODD). A first Small Form Factor (also called a Shuttle Form Factor or SFF) device 5 such as a Hard Disc Drive (HDD) may be coupled to tray 20 that has been adapted for installation into bay 15.

Advancements in technology and miniaturization allow peripheral devices to be manufactured with smaller form factors, but the form factor for bays 15, 16 may remain the same size to accommodate legacy devices. Accordingly, referring still to FIGS. 1 and 2, some approaches to installing components in case 11 generally involve installing a first SFF device 5 in a first bay 15 and installing a second SFF device 8 in a second (separate) bay 16. For example, as depicted in FIGS. 1 and 2, due to the small form factor of SFF device 5, SFF device 5 may be coupled to tray 20 and tray 20 may be installed in bay 15, and SFF device 8 may be larger and installed directly into bay 16.

In many information handling systems, each of tray 20 and SFF device 8 can be installed and removed using toolless installation/removal steps. Referring to FIG. 2, removal of tray 20 may be generally accomplished by sliding latch 24 to unlock tray 20 and sliding rails 21A, 21B out of slots 12A, 12B in bay 15. However, as shown in FIG. 2, many installation approaches use hardware 9 to couple device 5 directly to tray 20. Accordingly, removal of SFF device 5 may require removal of tray 20 from bay 15 and removal of hardware 9. For some cases 11, removal of SFF device 5 may require removing a panel (not shown), sliding latch 24 to release tray 20, removing tray 20 from bay 15 and removing hardware 9. A screwdriver or other tool may be necessary, and a user must be careful to avoid dropping hardware 9 in case 11.

Embodiments disclosed herein leverage improvements in small form factor (SFF) devices for condensing the size of case 11 and/or allowing more SFF devices 5, 8 in case 11. An SFF device 5, 8 that is compliant with an SFF categorization may be referred to by that categorization. For example, an SFF device that conforms to the SFF-8551 standard may be referred to as an SFF-8551 compliant device. As depicted in FIGS. 1 and 2, SFF device 5 installed in bay 15 may be a Hard Disk Drive (HDD) that represents an SFF-8551 device and SFF device 8 may be an Optical Disk Drive (ODD) that represents an SFF-8552 device.

FIG. 2 depicts a partial perspective view of the exemplary desktop case 11 of FIG. 1 with SFF device 5 and SFF device 8 removed. As depicted in FIG. 2, tray 20 has rails 21A, 21B on either side for slidable installation in slots 12A, 12B in bay 15. First SFF device 5 may be coupled to tray 20 using screws or other removable hardware 9.

Embodiments disclosed herein allow case 11 to accommodate multiple SFF devices 5, 8 in a single bay such that existing hardware 9 can be reused. Furthermore, toolless installation and removal of SFF devices 5, 8 make it easy for a user to customize an information handling system but still utilize case 11 having a limited number of bays 15, 16.

Figure 3:
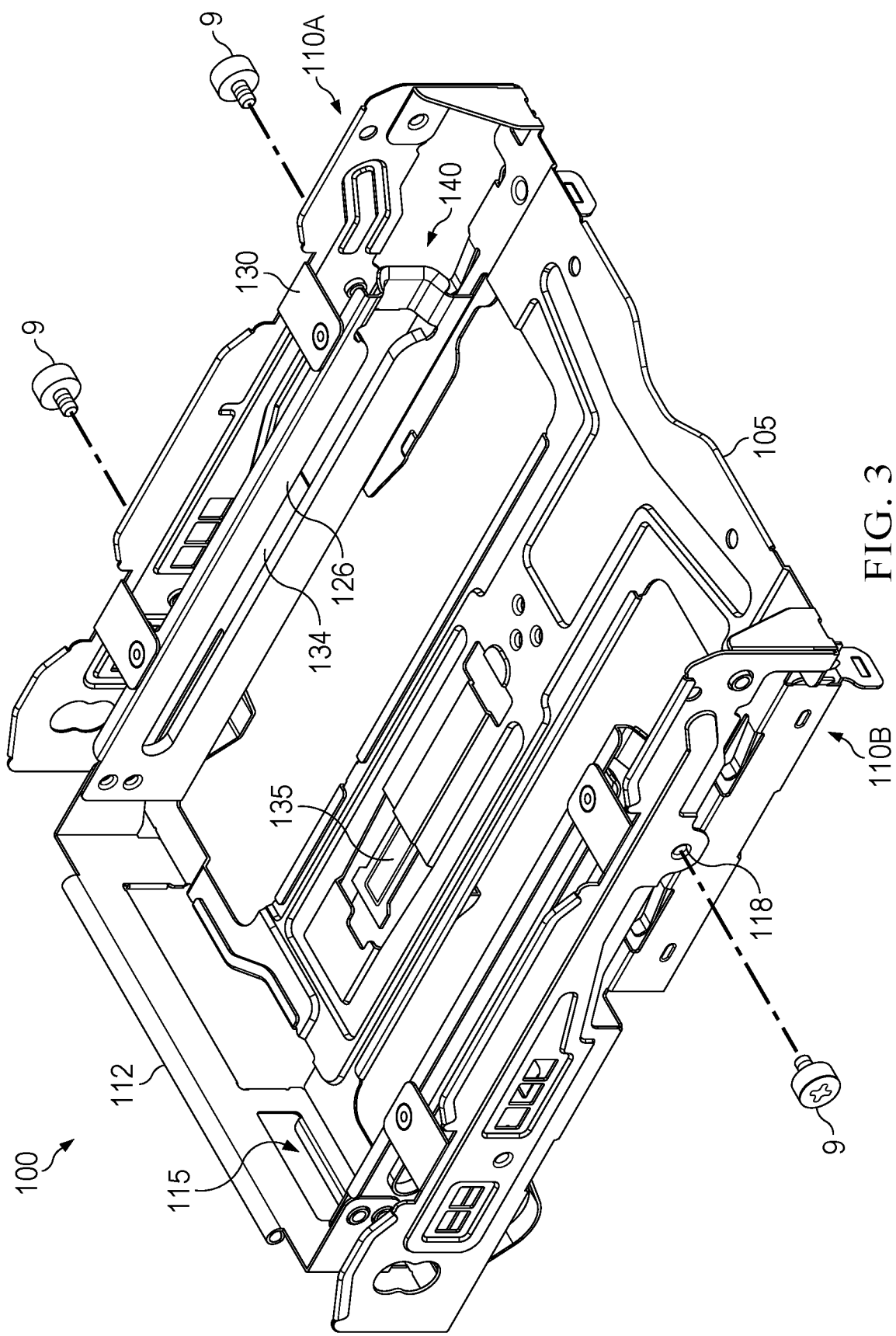
FIG. 3 depicts a perspective view of one embodiment of a bracket for installing multiple devices in a single bay in a desktop information handling system.

FIG. 3 depicts a perspective view of one embodiment of a bracket adapted for installing multiple SFF devices in a single bay. In embodiments such as depicted in FIG. 3, bracket 100 comprises base 105 with a pair of sidewalls 110A, 110B and rear wall 112. Each of sidewalls 110A, 110B may comprise openings 118 for receiving hardware 9. In some embodiments, openings 118 comprise threaded bores for engaging threads of screws. Hardware 9 may be configured for positioning in slots 12A, 12B in bay 15 to allow a user to slide bracket 100 in bay 15. Bracket 100 also comprises two inner walls 126 separated from but coupled to sidewalls 110A, 110B using lateral extensions 130. Each inner wall 126 may have slot 134 formed therein.

Base 105 divides bracket 100 into an upper portion and a lower portion, wherein the upper portion includes inner walls 126 with slots 134 and the lower portion includes flanges 140, as discussed below in more detail.

In some embodiments, base 105 may comprise locking feature 135 formed as a resilient member that is deflectable from a first (neutral) configuration to a second (deflected) configuration to allow bracket 100 to be installed in bay 15, wherein once bracket 100 is at least partially installed in bay 15, locking feature 135 may return from the second configuration to substantially the first configuration to secure bracket 100 in bay 15.

Rear wall 112 may include opening 115 for securing a tray to bracket 100, as discussed below in more detail.

Figure 4:
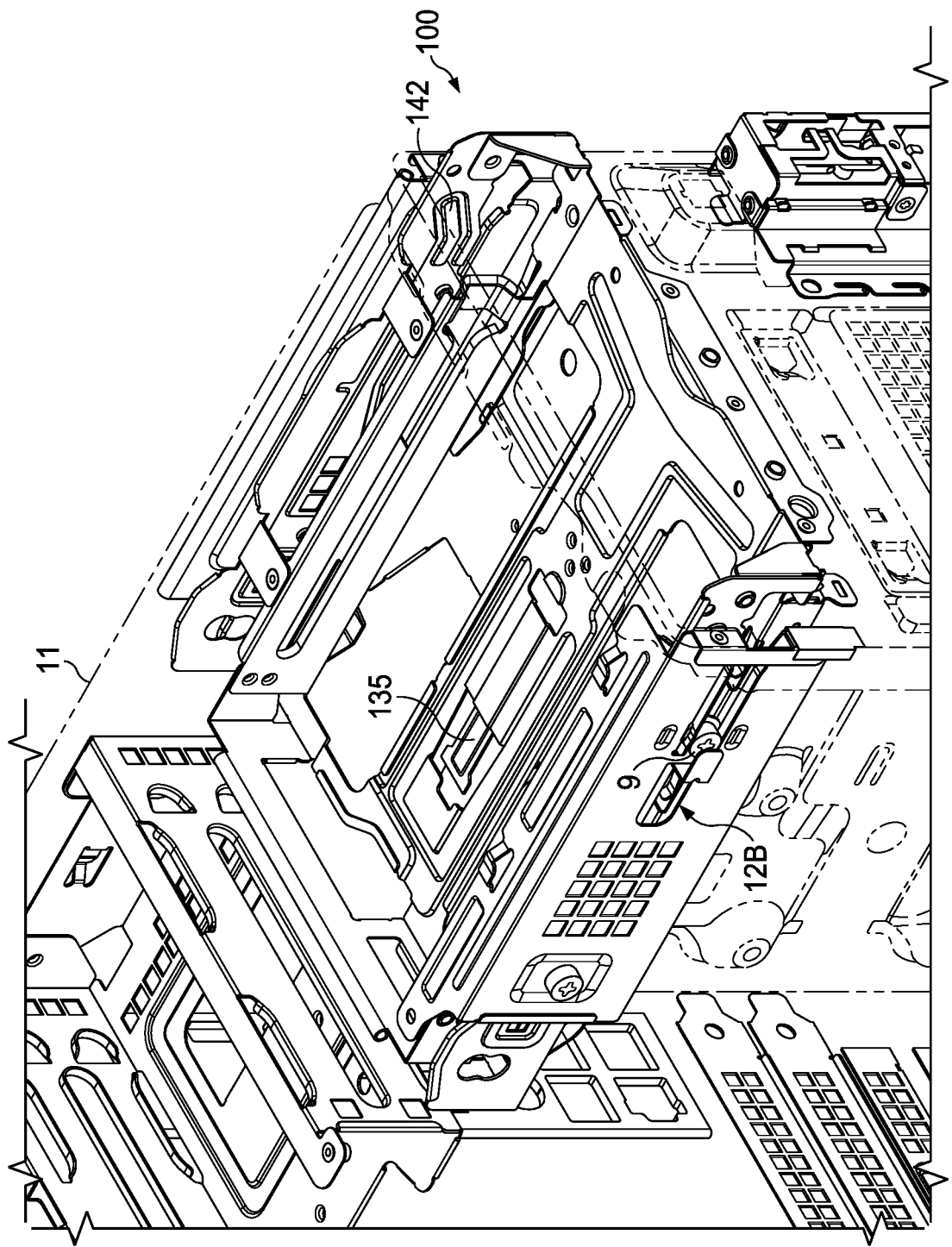
FIG. 4 depicts a partial perspective view of an exemplary desktop information handling system of FIG. 3 with one embodiment of a bracket installed in a half-height bay.

FIG. 4 depicts a partial perspective view of case 11 of a desktop information handling system with bracket 100 for installation into bay 15 (depicted in FIG. 1). Screws or other removable hardware 9 coupled to bracket 100 and positioned in slots 12A, 12B in bay 15 allow bracket 100 to be installed or removed easily from case 11. Locking feature 135 allows toolless installation, engagement, disengagement and removal of bracket 100 relative to case 11. Locking features 142 such as spring clips may facilitate quick and toolless installation and removal of SFF device 8 or tray 20 in bay 15. Accordingly, embodiments allow for toolless installation, engagement, disengagement and removal of components relative to case 11.

Figure 5A:
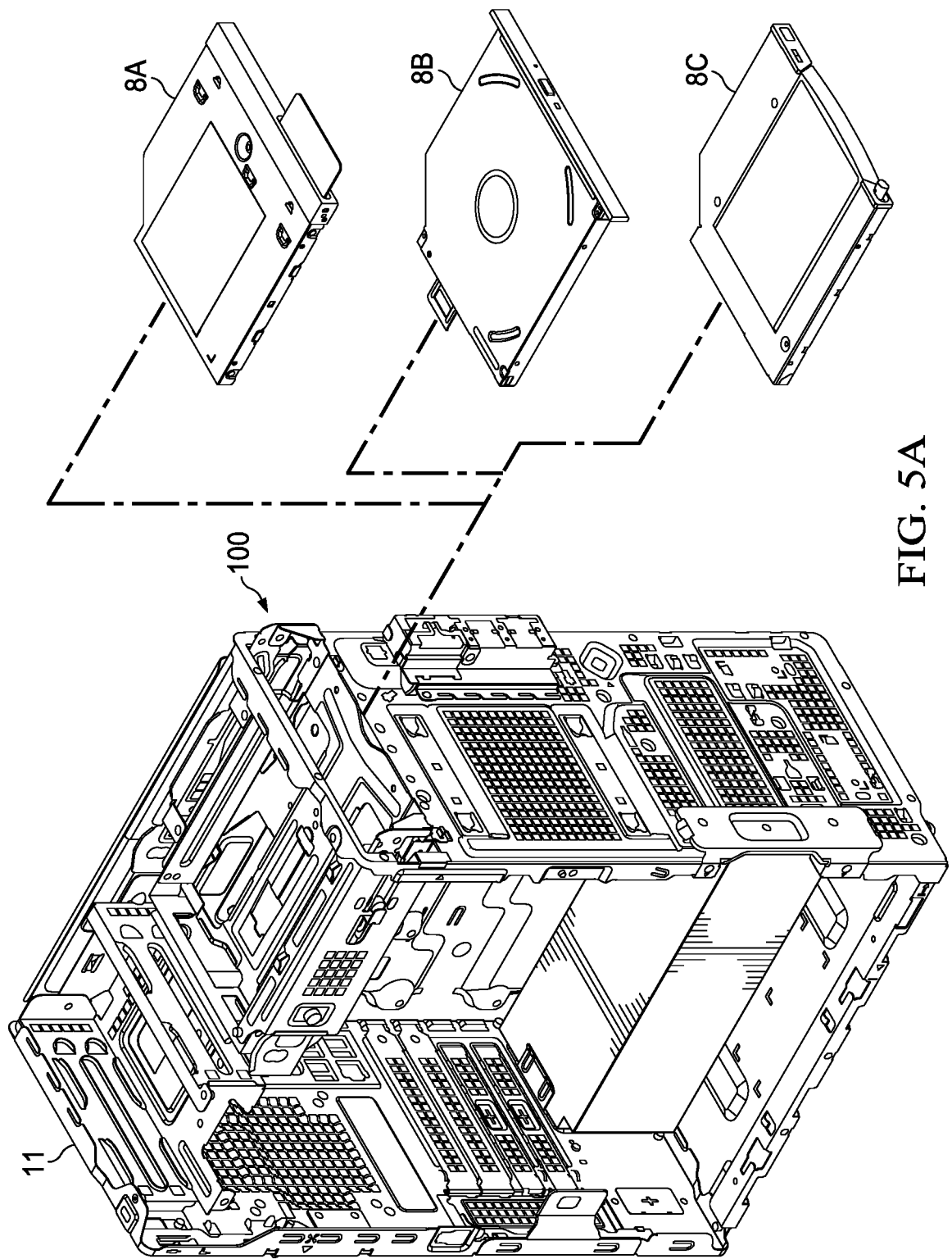
FIGS. 5A and 5B depict perspective and partial perspective views of a case for a desktop information handling system, illustrating different possible configurations and at least one method for installing multiple SFF devices in a single half-height bay.
Figure 5B:
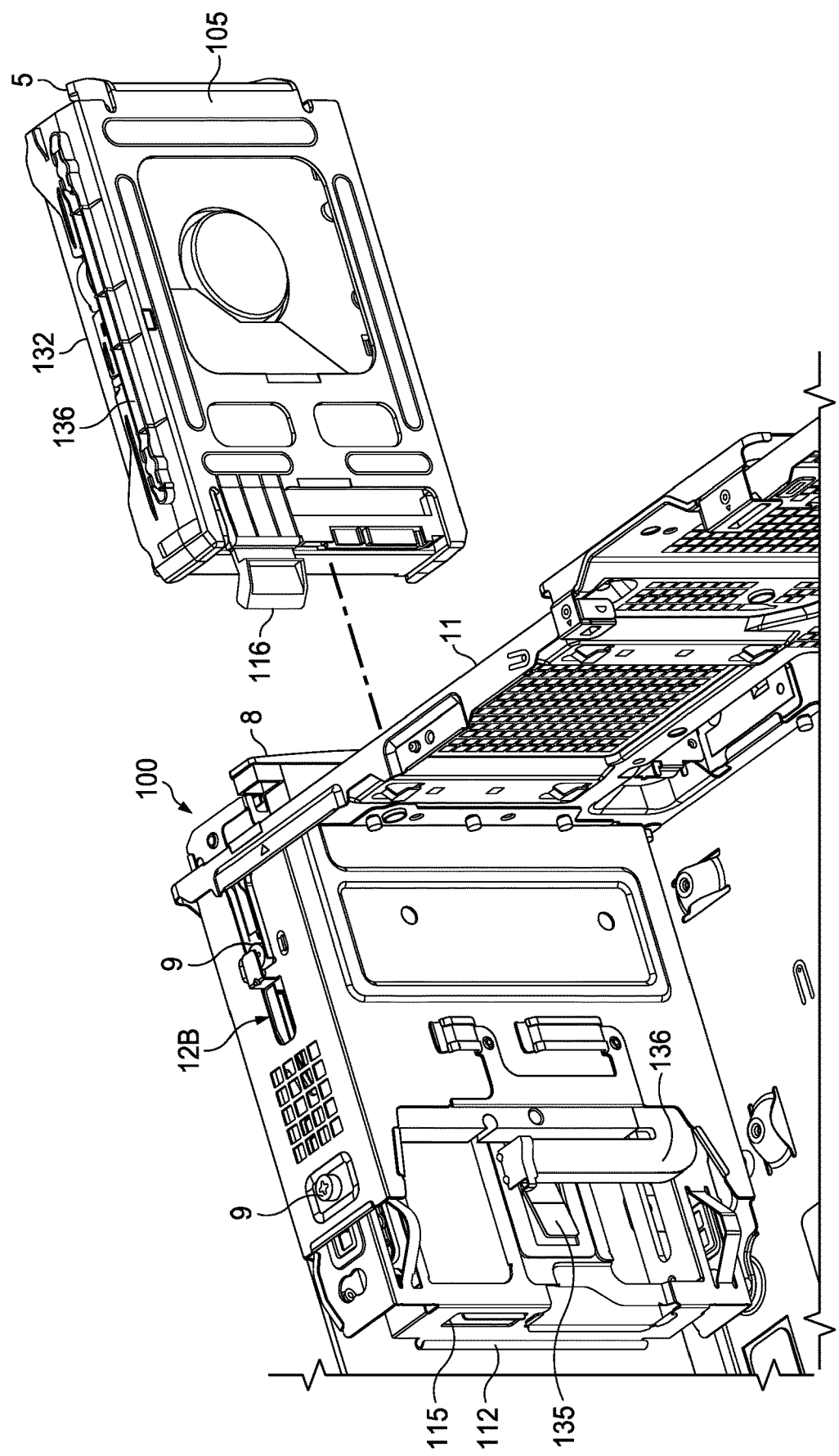

FIGS. 5A and 5B depict perspective and partial perspective views of case 11 of a desktop information handling system, illustrating different possible configurations and at least one method of installing multiple SFF devices 5, 8 in case 11 of an information handling system.

As depicted in FIG. 5A, in some embodiments, bracket 100 may be installed in bay 15 such that SFF device 8 may also be installed in bay 15. FIG. 5A depicts common access card (CAC) reader 8A, disk drive 8B and memory 8C representing three possible SFF devices 8 capable of being installed in bracket 100. SFF device 8 may be installed in a lower portion of bracket 100 installed in bay 15.

Installation and removal of one or more of bracket 100, tray 132, SFF device 5 and SFF device 8 may be possible using different sequences. As depicted in FIG. 5B, in some embodiments, SFF device 5 may be installed in tray 132 before tray 132 is installed in an upper portion of bracket 100. Tray 132 comprises rails 136 extending laterally from the sides of tray 132 for coupling to bracket 100 and deflectable tab 116 for securing tray 132 to bracket 100. Rails 136 on tray 132 may extend laterally less than rails 21 on tray 20 extend in order to fit inside bracket 100 in bay 15.

FIG. 5B depicts a partial perspective view of case 11 with bracket 100 installed in case 11 and SFF device 8 installed in a lower portion of bracket 100. Bracket 100 may be installed in case 11 by sliding hardware 9 in slots 12A, 12B. Bracket 100 may be secured to case 11 using locking member 135 engaged with case 11. SFF device 5 may be positioned in tray 132 and tray 132 may be positioned for installation in an upper portion of bracket 100. Securing tray 132 in bracket may comprise sliding rails 136 in slots 134 (not visible in FIG. 5B) to advance tray 132 into bracket 100. Advancing tray 132 in bracket 100 may advance tab 116 in opening 115, which may deflect tab 116 from a first configuration to a second configuration. Once tab 116 passes through opening 115, tab 116 may return to substantially the first configuration to engage an edge of opening 115 to securely couple tray 132 to bracket 100.

Figure 6A:
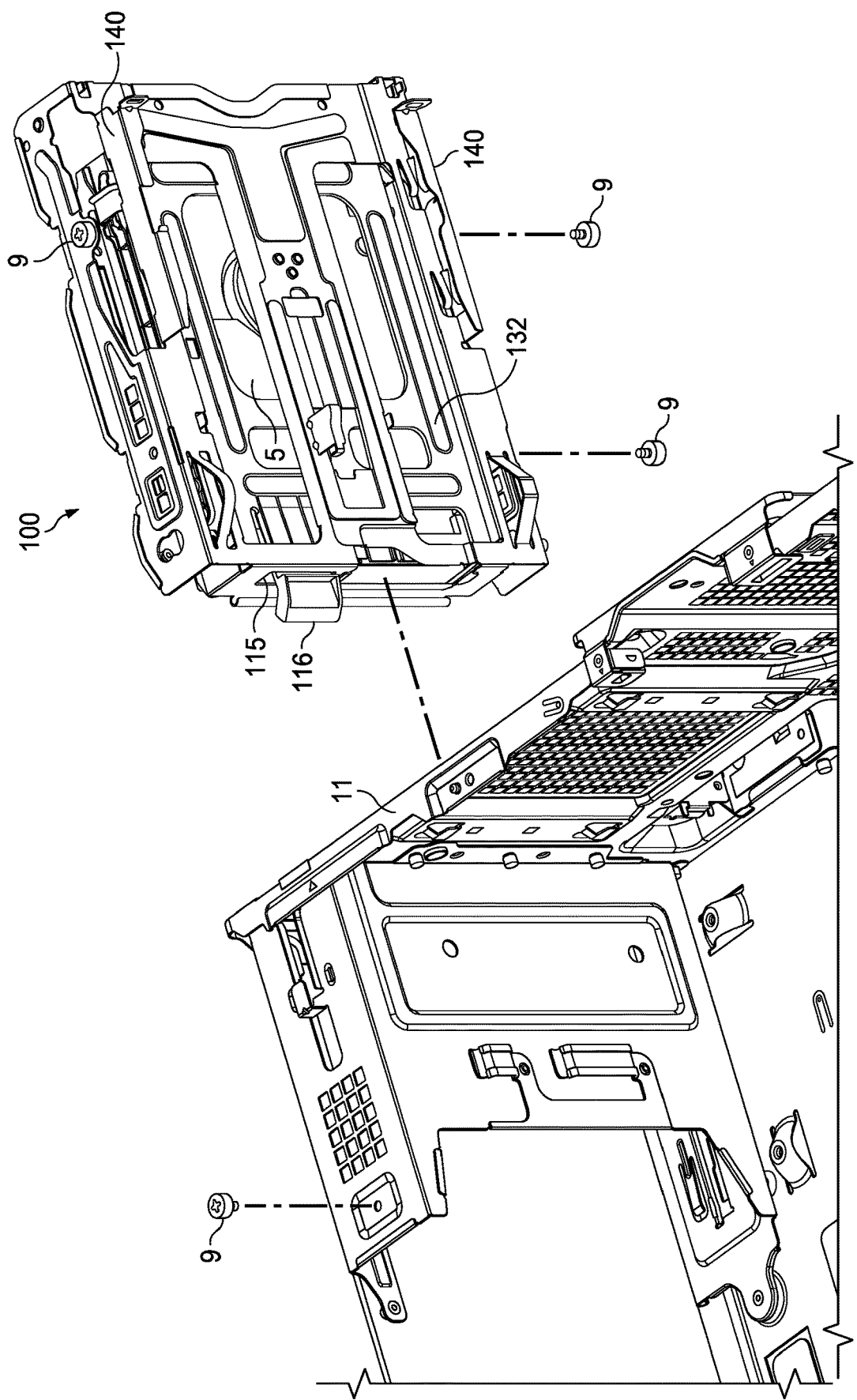
FIGS. 6A and 6B depict partial perspective views of a case for an exemplary information handling system and one embodiment of a bracket, illustrating a method of installing multiple SFF devices in a single half-height bay.
Figure 6B:
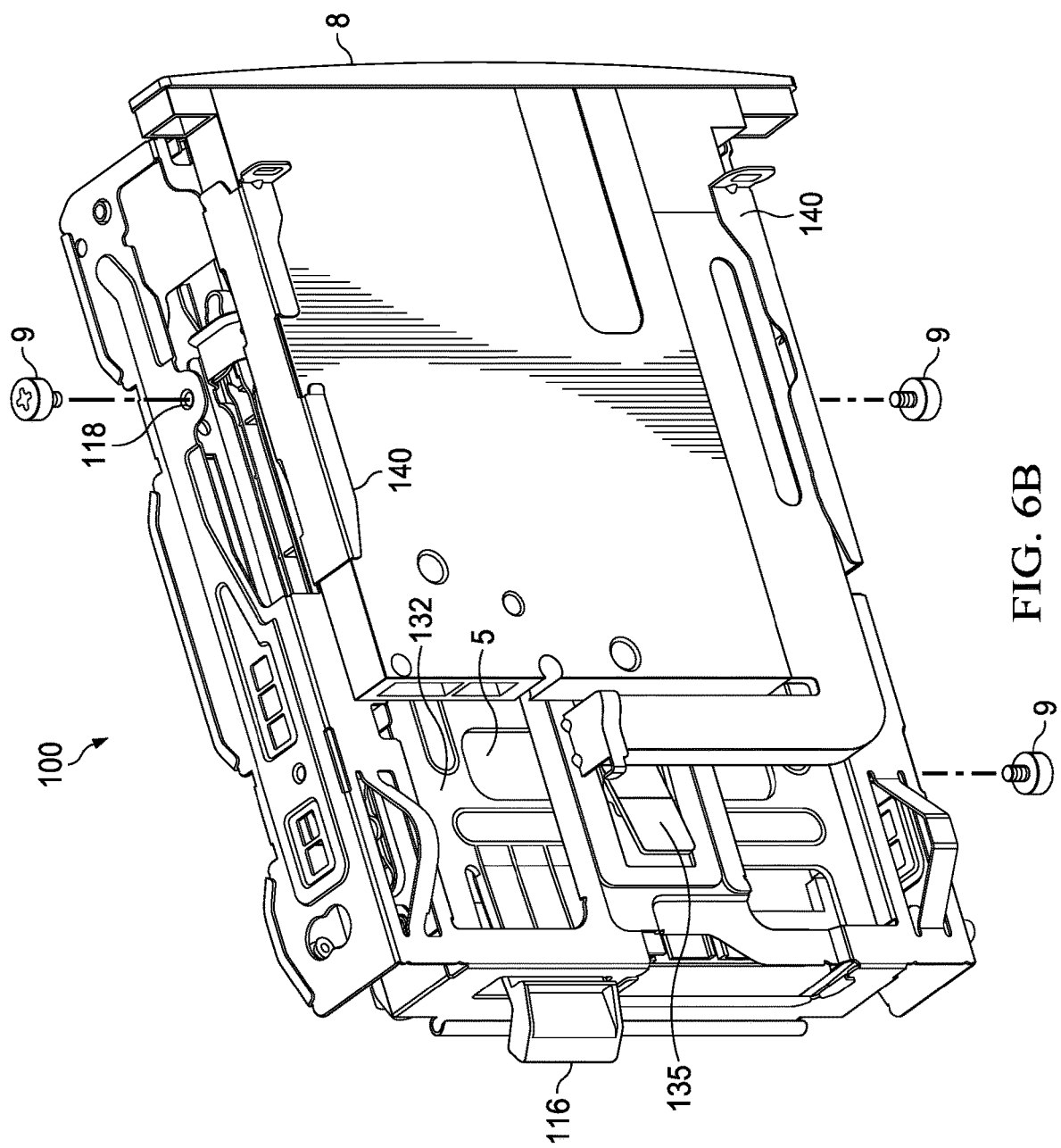

FIGS. 6A and 6B depict partial perspective views of case 11 and one embodiment of bracket 100 and tray 132, illustrating a method of installing multiple devices in a single bay 15 according to some embodiments.

As depicted in FIGS. 6A-6B, SFF device 5 may be installed in an upper portion of bracket 100 and SFF device 8 may be installed in a lower portion of bracket 100.

As depicted in FIGS. 6A and 6B, SFF device 5 may be positioned in tray 132. Tray 132 may be secured in an upper portion of bracket 100. Securing tray 132 in bracket 100 may comprise sliding rails 136 in slots 134 (not visible in FIG. 6A or 6B) to advance tray 132 in bracket 100. Advancing tray 132 in bracket 100 may advance tab 116 in opening 115, which may deflect tab 116 from a first configuration to a second configuration. Once tab 116 passes through opening 115, tab 116 may return to substantially the first configuration to engage an edge of opening 115 to securely couple tray 132 to bracket 100. In some embodiments, tray 132 may be formed integrally with tab 116 for secure coupling of tray 132 to bracket 100 while avoiding the costs and complexity of manufacturing a separate latch mechanism.

Referring to FIGS. 6A and 6B, SFF device 8 may be installed between base 105 and flanges 140 in a lower portion of bracket 100. Hardware 9 may be coupled to bracket 100, such as by engaging threads in openings 118. In some embodiments, hardware 9 comprises thumbscrews or other hardware not requiring tools to engage bracket 100. Advantageously, coupling hardware 9 to bracket 100 provides a system able to use existing hardware 9. Hardware 9 installed in threaded bores 118 extends laterally from sidewalls 110A, 110B. Hardware 9 positioned in slots 12A, 12B in bay 15 may act as guides for slidable installation, support, and removal of bracket 100 relative to bay 15.

Figure 7A:
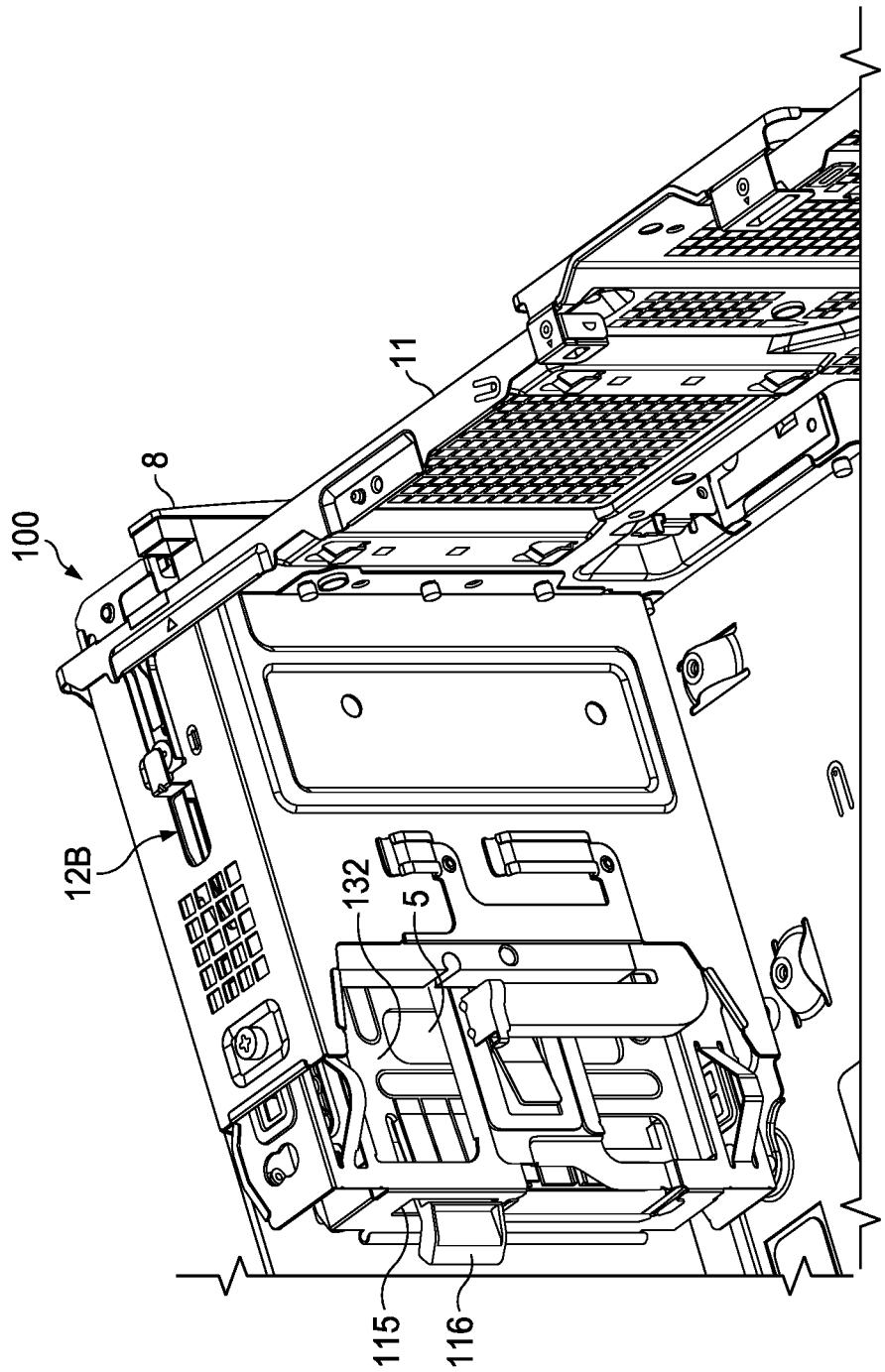
FIGS. 7A and 7B depict partial perspective views of a case for a desktop information handling system with a system for installing two SFF devices in a single half-height bay.
Figure 7B:
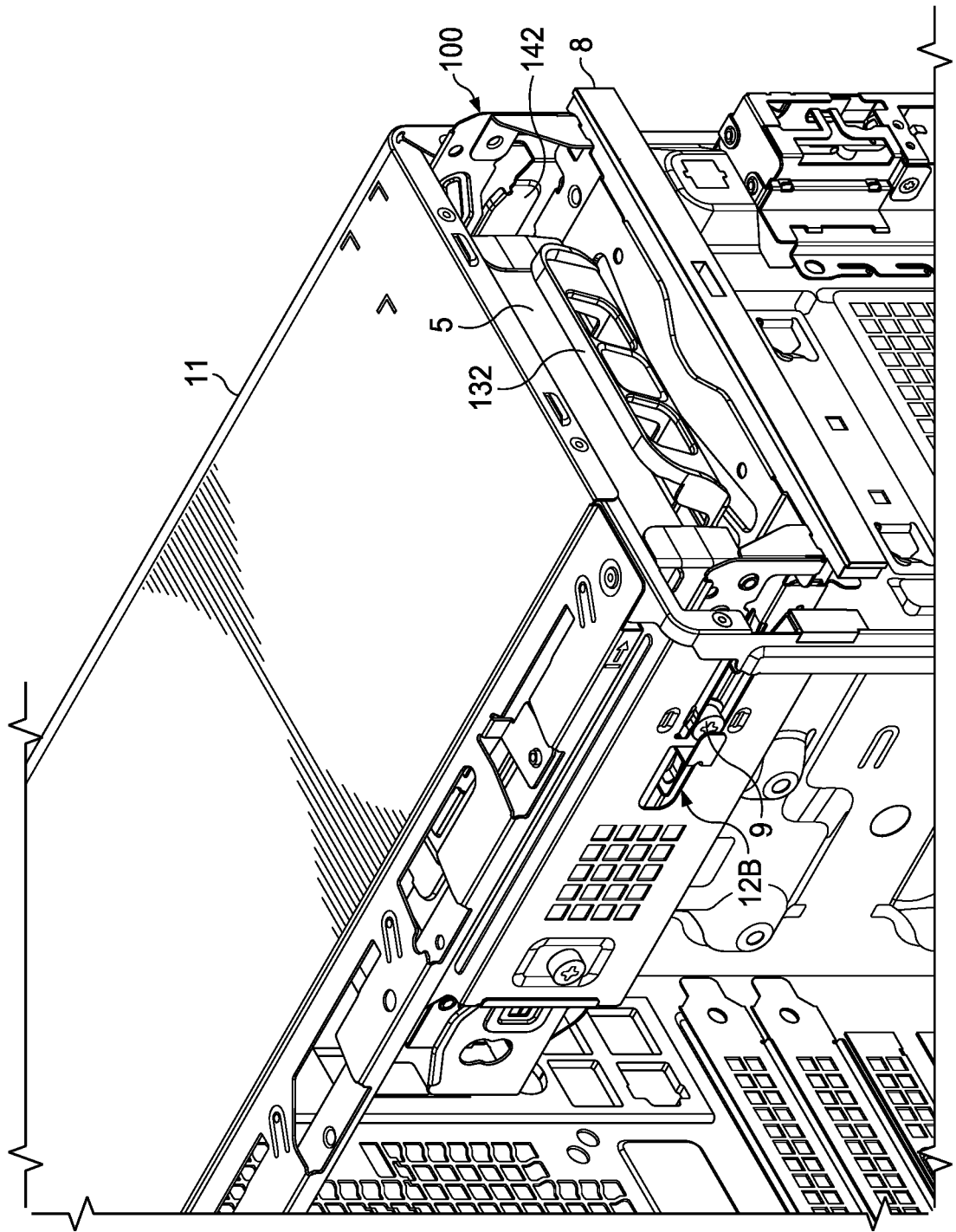

FIGS. 7A-7B depict partial perspective view of case 11 of a desktop information handling system with bracket 100 and tray 132 retaining two SFF devices. As depicted in FIGS. 7A-7B, SFF device 8 may be installed in a lower portion of bracket 100 and SFF device 5 may be positioned in tray 132 installed in an upper portion of bracket 100. SFF device 8 may be an Optical Disk Drive (ODD) and SFF device 5 may be a Hard Disk Drive (HDD). However, bracket 100 is configured to accommodate a variety of other SFF-8551 and SFF-8552 compliant devices to allow toolless customization of an information handling system without adding size or bays. Locking feature 142 may allow for toolless installation and removal of bracket 100 from bay 15.

Figure 8:
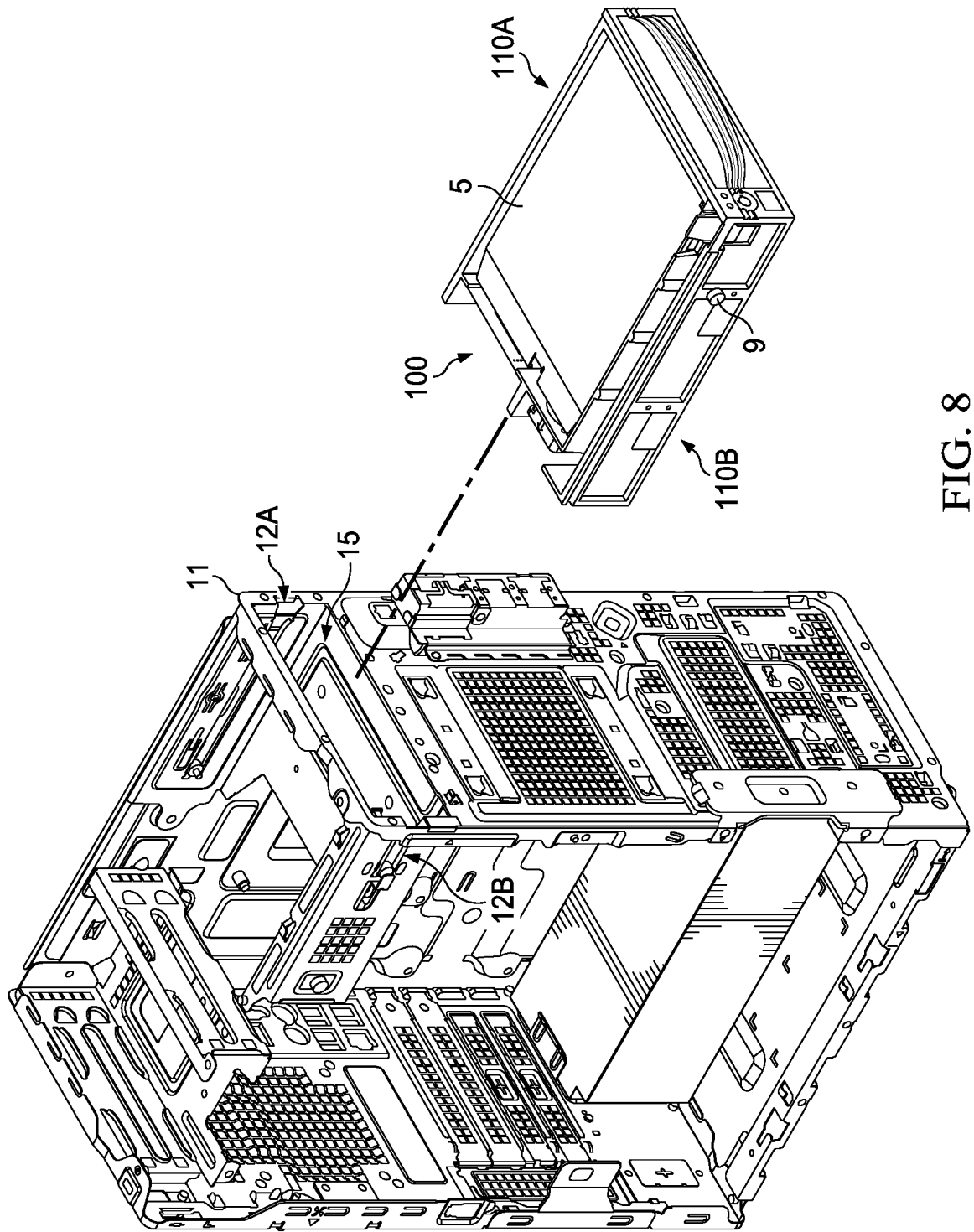
FIG. 8 depicts a perspective view of a case for a desktop information handling system with a system capable of installing two SFF devices or a single device in a single half-height bay.

Bracket 100 may be used for other configurations of an information handling system in case 11. FIG. 8 depicts a partial perspective view of case 11 of an exemplary information handling system in which tray 132 is removed and bracket 100 is configured to hold a single SFF device 5. Bracket 100 comprises sidewalls 110A, 110B configured with hardware 9 for toolless installation and removal relative to slots 12A, 12B in bay 15 of case 11. In the embodiment depicted in FIG. 8, bracket 100 may be configured for installation of device 5 according to some other form factor standard, enabling the information handing system to be customized to utilize devices with various form factors in the same bay 15. Hardware 9 may be used to couple SFF device 5 to bracket 100 and facilitate slidable installation and removal of SFF device 5 in bay 15.

A person of ordinary skill in the art will appreciate that the desktop information handling system depicted in the accompanying figures is merely illustrative and is not intended to limit the scope of the disclosure described herein. In particular, any computer system and/or device may include any combination of hardware or software capable of performing certain operations described herein. For instance, although the desktop information handling system is depicted with the bay at the uppermost part of the case, various systems and methods described herein may be adapted to work with other configurations.

In other implementations, one or more of the devices or components depicted with respect to the case 11 may be absent, or one or more other components may be added. Accordingly, systems and methods described herein may be implemented or executed with other computer system configurations.

Aspects of the present disclosure are described above with reference to components, systems and methods of manufacture according to embodiments of the disclosure. It will be understood by those of skill in the art, that certain steps and processes may be implemented in a different order and/or using different methods without departing in scope of the concepts.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system for installing multiple devices in a single bay in a case in an information handling system, the system comprising:
    a bracket for installation in the single bay, the bracket comprising:
        an upper portion defined by a base and a pair of sidewalls, wherein each sidewall is configured to receive hardware for slidable coupling to a slot in the case; and
        a lower portion comprising the base and a pair of flanges for receiving a first Small Form Factor (SFF) device; and
    a tray adapted for receiving a second SFF device, the tray comprising:
        a pair of rails for slidable insertion of the second SFF device in a pair of slots in the bracket.

2. The system of claim 1, wherein:
    each sidewall comprises a threaded bore for receiving threaded hardware, wherein the hardware is adapted for slidable coupling to the slot in the case.

3. The system of claim 1, wherein:
    the first SFF device and the second SFF device comprise one of an SFF-8551 compliant device and an SFF-8552 compliant device.

4. The system of claim 3, wherein:
the upper portion is adapted for installing one 3.5 inch Hard Disk Drive (HDD) or two 2.5 inch HDDs.

5. The system of claim 4, wherein:
the lower portion is configured for installing the SFF-8552 compliant device.

6. The system of claim 1, wherein:
the bracket comprises a rear wall having an opening;
the tray comprises a deflectable tab;
installation of the tray in the bracket comprises positioning the pair of rails of the tray in the pair of slots in the bracket; and
securing the tray to the bracket comprises advancing the tray in the bracket to advance the deflectable tab at least partially through the opening to deflect the deflectable tab from a first configuration to a second configuration, wherein advancing the tray in the bracket to advance the deflectable tab in the opening allows the deflectable tab to return to substantially the first configuration to engage an edge of the opening.

7. A system for installing multiple devices in a bay in a case of an information handling system, the system comprising:
a tray comprising a pair of rails, wherein the tray is configured for receiving a first SFF device; and
a bracket comprising:
a base, wherein the base divides the bracket into an upper portion and a lower portion;
two sidewalls, wherein each sidewall is configured to receive a hardware for slidable installation in a slot in the bay;
a pair of inner walls coupled to the two sidewalls, wherein each inner wall comprises a slot configured for receiving a rail of the pair of rails; and
a pair of flanges coupled to the base; wherein
the upper portion of the bracket is configured for engaging the tray; and
the lower portion of the bracket is configured for receiving a second SFF device.

8. The system of claim 7, wherein:
the bracket comprises a rear wall having an opening;
the tray comprises a deflectable tab;
slidable installation of the pair of rails in the slots in the bracket advances the deflectable tab in the opening to deflect the deflectable tab from a first configuration to a second configuration,
wherein the deflectable tab returns to substantially the first configuration to engage an edge of the opening.

9. The system of claim 7, wherein:
the bracket comprises a locking feature on the base;
slidable insertion of the bracket in the bay deflects the locking feature on the base from a first configuration to a second configuration,
wherein the locking feature on the base returns to substantially the first configuration to secure the bracket to the case.

10. The system of claim 7, wherein:
the first device and the second device comprise one or more of an SFF-8551 compliant device and an SFF-8552 compliant device.

11. The system of claim 10, wherein:
the lower portion of the bracket is configured for receiving the SFF-8552 compliant device.

12. A method of installing multiple SFF devices in a single bay in a case of an information handling system, the bay comprising a pair of slots, the method comprising:
installing a first SFF device in a tray comprising a pair of rails;
installing the tray in an upper portion of a bracket, wherein the upper portion comprises a base and a pair of inner walls, each inner wall having a slot for receiving a rail of the pair of rails;
installing a second SFF device in a lower portion of the bracket, the lower portion comprising the base and a pair of flanges; and
installing the bracket in the pair of slots in the bay.

13. The method of claim 12, wherein installing the bracket in the pair of slots in the bay comprises:
installing a hardware in a pair of sidewalls coupled to the pair of inner walls; and
positioning the hardware in the pair of slots in the bay.

14. The method of claim 13, wherein one or more of the first device and the second device comprises one of an SFF-8551 compliant device and an SFF-8552 compliant device.

15. The method of claim 12, further comprising one or more of securing the tray to the bracket and securing the bracket to the case.

16. The method of claim 15, wherein:
the bracket comprises a rear wall having an opening;
the tray comprises a deflectable tab; and
securing the tray to the bracket comprises:
positioning the pair of rails in the slots in the bracket;
sliding at least a portion of the tray in the bracket to advance the deflectable tab in the opening to deflect the deflectable tab from a first configuration to a second configuration; and
sliding the tray in the bracket, wherein the deflectable tab returns to substantially the first configuration to engage an edge of the opening.

17. The method of claim 15, wherein:
the bracket comprises a locking feature on the base; and
securing the bracket to the case comprises:
positioning the hardware in the pair of slots in the bay;
sliding at least a portion of the bracket in the bay to deflect the locking feature on the bracket from a first configuration to a second configuration; and
sliding the bracket in the case, wherein the locking feature returns to substantially the first configuration to secure the bracket to the case.

* * * * *